United States Patent [19]

Zimmerman

[11] 4,066,599

[45] Jan. 3, 1978

[54] COATING SYSTEM

[76] Inventor: Robert A. Zimmerman, 6601 Rockbrook, St. Louis, Mo. 63133

[21] Appl. No.: 576,556

[22] Filed: May 12, 1975

[51] Int. Cl.$^2$ .......................... C08K 5/01; C08K 5/49; C08L 47/00; C08L 75/04

[52] U.S. Cl. ..................... 260/30.6 R; 260/23.8 R; 260/32.8 N; 260/33.2 R; 260/33.6 UB; 260/33.6 UA; 260/42.37; 260/42.47; 260/859 R; 260/893

[58] Field of Search ................. 260/30.6 R, 33.6 UB, 260/859 R, 893, 32.8 N, 33.2 R

[56] References Cited

U.S. PATENT DOCUMENTS

| | | | |
|---|---|---|---|
| 3,714,110 | 1/1973 | Verdol et al. | 260/33.6 UB |
| 3,869,421 | 3/1975 | Sapp et al. | 260/859 R |

OTHER PUBLICATIONS

Arco Chemical Company, Product Bulletin BD-1.
Arco Chemical Company, Product Bulletin BD-2.
Arco Chemical Company, "Poly bd Liquid Resins" (for improved liquid rubber technology).
Arco Chemical Company Bulletin designated for "for improved liquid rubber liquid rubber technology".

*Primary Examiner*—Allan Lieberman
*Attorney, Agent, or Firm*—Koenig, Senniger, Powers and Leavitt

[57] ABSTRACT

A system adapted for the application of a moisture-proof barrier to a substrate. The system comprises a liquid rubber precursor formulation and an isocyanate formulation which are adapted for mixing to provide a reactive mixture for application to the substrate. The liquid rubber precursor includes a hydroxyl terminated butadiene polymer, a polyether triol, an organo-mercury catalyst, carbon black, a low oil absorbency silica, a suspending agent for the silica, a molecular sieve dessicant, a limited proportion of an organic solvent, and lecithin in an amount sufficient to provide a formulation viscosity of not greater than about 20,000 cps at 27° C. The second formulation contains a urethane prepolymer derived from a polypropylene glycol ether polyol and toluene diisocyanate, containing between about 13 and about 17% by weight free isocyanate groups.

13 Claims, No Drawings

COATING SYSTEM

BACKGROUND OF THE INVENTION

This invention relates to the field of coating compositions and, more particularly, to a two-component system which can be combined to provide a reactive mixture useful as a roofing composition or floor coating.

A basic, but often elusive, requirement of roofing compositions is imperviousness to moisture. To provide satisfactory long-term protection of the roofing structure and the building beneath it, a roofing composition should seal the roof to afford continuing protection against penetration by moisture. Since the roof itself is not always free of depressions nor adequately drained, a particularly important feature is resistance of the roofing composition to penetration by ponded water. A further important characteristic is resistance to penetration by water vapor.

In order to remain leakproof over an extended service life, a roofing composition must remain flexible over wide temperature ranges so as to avoid cracking or separating from structural members against which it is sealed. The composition must also possess adequate thermal stability and, in particular, should be free of any tendency for oils contained therein to bleed out and saturate roof paper or felting. Resistance to oxidation is another significant requirement if a roofing composition is to serve effectively over an extended period of time.

Conventional bituminous roofing compositions are known to provide reasonably satisfactory service over a period of several years but do not always provide the desired combination of moisture resistance, leakproofness and longevity.

SUMMARY OF THE INVENTION

Among the several objects of the present invention, therefore, may be noted the provision of an improved roof coating; the provision of a roof coating which is imprevious to moisture, in particular, one which is both resistant to ponded water and effective as a vapor barrier; the provision of a roof coating possessed of high elongation so as to retain flexibility and resistance to leak development; the provision of such a coating which has adequate tensile strength; the provision of such a coating which is thermally stable and resistant to oil bleeding; the provision of such a coating which is resistant to oxidation; the provision of such a coating which is readily applied to a substrate; and the provision of methods for preparing a reactive mixture cureable into such a coating and for applying it to a substrate. Other objects and features will be in part apparent and in part pointed out hereinafter.

The present invention, therefore, is directed to a liquid rubber precursor formulation, adapted for reaction with a second formulation containing isocyanate groups to provide a moisture-proof barrier for a substrate. The liquid rubber precursor formulation comprises between about 12 and about 32 by weight of a hydroxyl terminated butadiene polymer, between about 2 and about 14% by weight of a polyether triol having a hydroxyl number of between about 300 and about 500, between about 0.08 and about 0.8% by weight of an organomercury catalyst, between about 2 and about 24% by weight of a low oil absorbency silica, at least about 0.1% by weight of a suspending agent for the low oil absorbency silica, a molecular sieve dessicant in an amount sufficient to provide a free moisture content of not greater than about 0.2% by weight, up to about 8% by weight of an organic solvent selected from the group consisting of aromatic solvents, ketones, esters and glycol ethers, and lecithin in an amount sufficient to provide a formulation viscosity of not greater than about 20,000 cps at 27° C.

The invention is further directed to a system adapted for application of a moisture-proof barrier to a substrate. The system comprises two formulations which are adapted for mixing to provide a reactive mixture for application to the substrate. The first formulation is a liquid rubber precursor formulation of the type described above, while the second formulation comprises a urethane prepolymer derived from a polypropylene glycol ether polyol and toluene diisocyanate, containing between about 13 and about 17% by weight free isocyanate groups.

Further included in the invention is a method of applying a moisture-proof barrier to a substrate by mixing the aforesaid formulations to provide a reactive mixture, applying the reactive mixture to the surface of the substrate at a temperature greater than about 35° F., and allowing the mixture to cure.

DESCRIPTION OF THE PREFERRED EMBODIMENTS

In accordance with the present invention, it has now been discovered that a strong, flexible, moisture-proof roof coating can be prepared from a reactive mixture containing a hydroxyl terminated butadiene polymer, a polyether triol, a prepolymer derived from a polypropylene glycol diol and toluene diisocyanate, and an organo-mercury catalyst. The reactive mixture is prepared from a system comprising two separate formulations, one of which is a liquid rubber precursor containing hydroxyl functionality in the form of the hydroxylated butadiene polymer and triol and the other of which includes the aforesaid prepolymer containing an excess of isocyanate groups. The reactive mixture prepared by mixing these formulations is a moderate viscosity fluid which can be readily applied to the surface of the substrate through a spray gun. Like most urethane systems, this reactive mixture has a somewhat limited pot life and is, consequently, prepared immediately before application by mixing of the liquid rubber precursor formulation and the isocyanate formulation at the site of the substrate which is to be coated.

In addition to the hydroxyl terminated butadiene polymer and the polyether triol, the essential components of the first (liquid rubber precursor) formulation include carbon black, a mercury catalyst for the hydroxyl/isocyanate reaction, a low oil absorbency silica, a suspending agent for the low oil absorbency silica, lecithin, and a molecular sieve dessicant.

The butadiene polymer is preferably a homopolymer of butadiene with terminal hydroxyl groups of the type sold under the trade designation "Poly bd Liquid Resin R-45 HT" by Arco Chemical Company, division of Atlantic Richfield Company. "R-45 HT" has the structure:

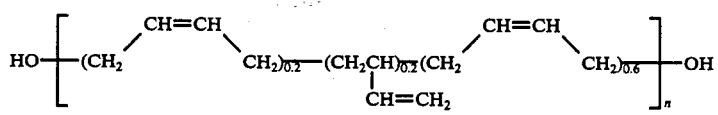

where n is about 50. It has a viscosity of 50 poise at 30° C., a hydroxyl value of 0.83, a moisture content of 0.05 % by weight, and an iodine number of 398. As indicated, the polymer microstructure includes 60% trans-1,4, 20% cis-1,4, and 20% vinyl-1,2 butadiene units.

While generally less preferred, a hydroxyl terminated butadiene/styrene copolymer and a butadiene/acrylonitrile copolymer sold under the trade designations "Poly bd CS-15" and "Poly bd CN-15", respectively, by Arco Chemical Company may also be used in the formulation of the invention. The "CS-15" styrene/butadiene copolymer has the structural formula:

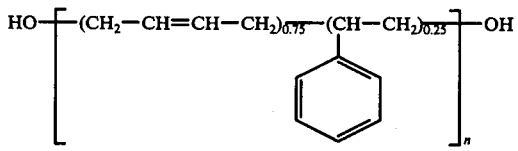

where n is about 54. "CS-15" has a viscosity of 150 poise at 30° C., a hydroxyl value of 0.65 milliequivalents/g, a moisture content of 0.05% by weight, and an iodine number of 335. The polybutadiene microstructure of "CS-15" is the same as "R-45 HT".

The "CN-15" butadiene/acrylonitrile copolymer comforms to the structural formula:

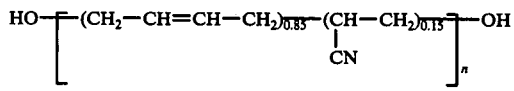

where n ranges from about 78 to about 87. "CS-15" has a viscosity of 525 poise at 30° C., a hydroxyl value of 0.60 milliequivalents/g, a moisture content of 0.05% by weight, and an iodine number of 345. Again the polybutadiene microstructure is the same as for "R-45 HT".

The hydroxyl functionality of "Poly bd R-15 HT" is estimated to be in the range of between about 2.2 and about 2.4. For "CS-15" the range is estimated at from about 2.1 to about 2.23, and for "CN-15" from about 2.5 to about 2.8.

The polybutadiene component of the liquid rubber formulation is instrumental in affording the highly elastomeric properties of the cured coating of the invention. The first (liquid rubber precursor) formulation should contain between about 12 and about 32% by weight of the hydroxyl terminated butadiene polymer.

The polyether polyol component of the liquid rubber precursor formulation must have a relatively high hydroxyl number in the range of about 300 to 500 in order to provide adequate reactivity and thereby introduce the proper density of urethane linkages into the cured coating composition. Such density of urethane linkages is essential in order to provide adequate tensile strength in the cured coating. A suitable triol is that sold under the trade designation "Poly G-430 PG" by Olin Corporation. "Poly G-430 PG" has a molecular weight of 441, an average hydroxyl number of 383 mg KOH/g, a maximum acid number of 0.05 mg KOH/g, a maximum water content of 0.02%, an average pH of 6.0, a typical viscosity of 352 cps and a specific gravity of 0.050 at 25° C. Preferably, the polyether triol content of the liquid rubber precursor formulation ranges between about 2 and about 14% by weight.

Carbon black not only imparts the desired and conventional black color to the formulation but also serves to increase the strength of the cured coating. Among the carbon blacks useful in the formulation of the invention is that sold under the trade designation "Raven 500" by the Columbian Division of Cities Service Corporation. "Raven 500" has a blackness index of 95, an arithmetic mean particle diameter of 54 m$\mu$, a surface area (by nitrogen adsorption) of 33 m$^2$/g, an oil absorbency of 65 gals/100 lbs by the Venuto fluid paste method, an oil absorbency of 10.6 gals/100 lbs by the stiff paste end point method, a pH of 7.0, a moisture free analysis of 98.8% fixed carbon and 1.2% volatile matter, and an apparent density of 17 lbs/ft$^3$. The liquid rubber precursor formulation should contain on the order of between about 2 and about 10% by weight carbon black.

The organo-mercury catalyst promotes reaction between the hydroxyl functionality of the liquid rubber precursor formulation and the isocyanate functionality of the second formulation. A particularly preferred catalyst is the aryl organo-mercury catalyst sold under the trade designation "Cocure 23" by the Cosan Chemical Corporation. "Cocure 23" is particularly desirable since it promotes long chain formation and limits the extent of cross-linking, thereby enhancing the elongation of the cured coating. Tensile strength is also improved. Because "Cocure 23" is not acidic, it does not promote the release of moisture. A major practical advantage accrues from the use of "Cocure 23" is carrying out the coating process of the invention since reactive mixtures prepared from an isocyanate formulation and a hydroxyl formulation containing "Cocure 23" have relatively long pot lives at ambient temperatures, i.e., on the order of 2–3 hrs. The catalyst component should comprise on the order of between about 0.08 and about 0.8% by weight of the liquid rubber precursor formulation.

The low oil absorbency silica component of the first formulation not only serves as a filler but assists in reducing the viscosity of the formulation and the reactive mixture prepared therefrom, thereby promoting the relatively high fluidity which renders the reactive mixture readily susceptible to application by spray techniques. In order to afford the minimum oil absorbency, the silica component is preferably selected from silicas having a relatively low surface area, in particular, silicas having acicular crystal form. An especially suitable silica component is that sold under the trade designation "Novacite 325" by Malvern Minerals Company. "Novacite325" has a specific gravity of 2.650 at 70° F., a Mohs scale hardness of 7.0, an index of refraction of 1.550, a true density of 22.07 lbs/gal, an oil absorption of 20 lbs raw linseed oil to wet 100 lbs, and an average particle size of 9.5 m. The low oil absorbency silica component of the first formulation should range between about 2 and about 24% by weight.

To prevent settling of the low oil absorbency silica, a suspending agent is included in the first formulation. A suitable suspending agent is fumed silica such as that sold under the trade designation "Aerosil 200" by Degussa, Inc. The formulation should include between about 0.1 and about 1% by weight of the suspending agent.

In order to avoid foaming when the first (liquid rubber precursor) formulation is mixed with the second (isocyanate) formulation, it is essential that moisture be excluded. Water reacts with isocyanate groups to liberate carbon dioxide, with resultant foaming of the reactive mixture. It has been found that foaming is effectively prevented if the moisture content of the first formulation is maintained at a level not higher than about 0.2% by weight. Such low moisture level is provided by inclusion of a dessicant in the first formulation, in particular, a molecular sieve type dessicant. Molecular sieve type dessicants have been found to be substantially superior to more conventional lime dessicants. A dessicant which has been found to be especially useful in the formulation of the invention is the molecular sieve sold under the trade designation "Syloid ZN-1" by Davison Chemical Division of W. R. Grace. "Syloid ZN-1" corresponds to the chemical formula $Na_2O:Al_2O_3:2.8\ SiO_2:XH_2O$, has a moisture adsorptivity of up to 36% by weight, a density of 30 lbs/ft$^3$, a particle size of 99.95% minus 325 mesh, a specific gravity of 2.103, and an oil absorption of 37 lbs/100 lbs. To meet the above-noted maximum moisture content requirement, it has been found that the first formulation should normally contain between about 0.08 and about 2% by weight of the molecular sieve dessicant.

Lecithin is an essential component of the formulation for purpose of reducing viscosity to such a level that the reactive mixture prepared from the hydroxyl and isocyanate formulations can be readily sprayed onto a substrate. Lecithin acts as a wetting agent in the formulation, wetting the surfaces of the solids contained therein, thereby reducing surface tension and, consequently, reducing viscosity. Although other wetting agents might be used for this purpose, lecithin is strongly preferred since relatively small amounts of lecithin provide the desired results. If other surfactants were used, larger proportions would be required, resulting in a risk of absorption of excessive amounts of moisture, which in turn could lead to foaming in the reactive mixture. Among the useful sources of lecithin are the soya lecithin concentrates sold under the trade designation "Sta-Sol" by the Protein Division of A. E. Staley Manufacturing Company. These concentrates generally consist of between about 60 and 70% acetone insoluble phosphatides, and the balance essentially oil. The moisture content is about 0.2% by weight, the residual fiber content 0.2% by weight, the viscosity 70-150 poises at 77° F., the pH (10% solution) 5.6-6, and the free fatty acid content about 1.5% (acetone soluble portion), the acid value 24 mg KOH/g, the density between about 8.45 and about 8.6 lbs/gal at 60° F. The first formulation should contain a sufficient proportion of lecithin to provide a Brookfield viscosity of not greater than about 20,000 cps at 27° C., as measured in an RVF model viscometer using a #3 spindle at 4 rpm. Typically, the provision of such viscosity requires on the order of about 0.04 and about 0.8% by weight lecithin.

In addition to its essential components, the first formulation may also advantageously contain an asphalt extender, a high boiling aromatic oil, an organic solvent, a silicone antifoaming compound, an antioxidant, and an untraviolet light absorber.

The asphalt extender is an important component of the commercial formulation since its presence significantly reduces the cost of the formulation and renders it highly competitive with conventional roofing compositions. "Trumbull Asphalt 85/100" is suitable. Where included, the asphalt component may constitute between about 4 and about 53% by weight of the first formulation.

In order to incorporate the asphalt component into the liquid rubber precursor formulation, it premixed with a high boiling aromatic process oil in a ratio of between about 1 and about 1.5 parts by weight asphalt per part by weight oil, and this premix is then blended with the remaining components of the formulation. The aromatic process oil may constitute between about 3 and about 44% by weight of the liquid rubber precursor formulation. A particularly suitable process oil for use in the formulation of the invention is that sold under the trade designation "Ashland APO" by Ashland Oil & Refining Company. "Ashland APO" has a density of 9.2 lbs/gal, a pour point of $-5°$ F., a refractive index of 1.6750, an aniline point of 20° F., and a closed cup flash point of 360° F. The initial boiling point of "APO" is 620° F. In distilling this material, 10% is collected in the overheads at 645° F., 30% at 660° F., 50% at 675° F., 70% at 695° F., and 90% at 740° F.

The presence of an organic solvent in the liquid rubber precursor formulation works together with the low oil absorbency silica and the molecular sieve dessicant to provide the required low viscosity. If sufficient solvent were to be utilized, of course, the desired viscosity could be realized without using any silica or lecithin. The presence of such large proportions of solvent, however, could lead to the formation of voids during the drying and curing of the reactive mixture on the substrate to which it is applied. Excessive shrinkage during drying and curing would also be experienced. Thus, the maximum proportion of organic solvent which can normally be tolerated in the liquid rubber precursor formulation is on the order of about 8% by weight. A preferred solvent is xylene but other aromatic solvents, ketones, esters and glycol ethers can be utilized. Aliphatic solvents are less effective and, preferably, not used.

Inclusion of an untraviolet light absorber helps to preserve the long-term flexibility and strength of the coating produced from the system of the invention. Various conventional u.v. absorbers may be used. A particularly suitable absorber is diethyl-3-acetyl 4-hydroxybenzyl phosphonate which is sold under the trade designation "Busorb 34" by Buckman Laboratories, Inc. Where utilized, the u.v. absorber may constitute between about 0.04 and about 0.8% by weight of the first formulation.

The presence of an antioxidant further serves to preserve the flexibility of the cured coating. Again, a variety of conventional anitoxidants may be used. A particularly preferred antioxidant is that sold under the trade designation "Nevastain 21" by Neville Chemical Company. Where it is used, the antioxidant should comprise between about 0.2 and 1.2% by weight of the formulation.

Silicone antifoaming agents may also be advantageously incorporated in the first formulation. A particularly suitable antifoaming agent is that sold under the trade designation "Foamkill 8D" by Crucible Chemical Company. "Foamkill 8D" has a density of 8.2 lbs/gal and a viscosity of between 500–900 cps at 25° C. The first formulation may advantageously contain between about 0.08 and about 1.2% by weight of the antifoaming compound.

In preparing a liquid rubber precursor formulation containing the asphalt/aromatic process oil premix, it is important that both this premix and the remaining components of the formulation be preheated before they are blended with one another. Thus, in a preferred scheme, the asphalt is heated to 160°–170° F. and the process oil worked in at that temperature to provide a first premix, while a second premix containing the hydroxyl terminated butadiene polymer, polyether triol, silica, dessicant, lecithin and other components of the formulation is separately preheated to about 150° F. The two premixes may then be blended by adding the asphalt/process oil to the second premix. If blending is attempted at lower temperatures, there is a serious risk of the resin components separating from the remainder of the formulation and gelling.

It is further important that each of the components used in preparing the first formulation be kept dry before blending. Otherwise, the dessicant will be insufficient, the 0.2% moisture maximum violated, and foaming incurred when the reactive mixture is prepared by mixing the first formulation with the second. Normal precautions are usually adquate to insure the requisite dryness, and it has not been found necessary to conduct the blending operation under dried air or an inert atmosphere.

The essential component of the second (isocyanate) formulation is a prepolymer of a polyproylene glycol ether polyol and toluene diisocyanate. In order to impart the desired properties to the cured reaction mixture, the prepolymer should have a free isocyanate ontent of between 13 and 17% by weight. If the isocyanate content is too high, the reactivity of the system is too fast and the pot life too low for convenient use. Additionally, the cost of the formulation tends to be increased by excessively high isocyanate content in the prepolymer. If, on the other hand, the isocyanate content of the second formulation is too low, the reactivity of the system will not only be too low to provide the desired rate of curing but the physical characteristics of the cured coating are inferior to those achieved with a free isocyanate content of 13–17% by weight. Another important factor in providing the optimum physical characteristics of the cured coating is the polypropylene glycol base structure of the prepolymer. A propylene glycol structure has been found to be materially superior to a polyethylene structure in this regard.

An especially suitable prepolymer component of the second formulation is that sold under the trade designation "RD-206" by the Trancoa Chemical Corporation. "RD-206" is derived from a polypropylene glycol ether diol and toluene diisocyanate and contains about 15% by weight isocyanate groups. It is typically prepared from an isomeric mixture of toluene diisocyanates containing 80% by weight 2,4-toluene diisocyanate and 20% by weight 2,6-toluene diisocyanate, such as that sold under the trade designation "Mondur TD-80" by Mobay Chemical Company.

Preferably, the second formulation of the system of the invention also includes an organic solvent of the same type used in the first formulation. The amount of organic solvent is adjusted to allow the proper proportions of the components of the reactive mixture to be provided by mixing readily measurable amounts of the two formulations.

The system of the invention comprises the two above-described formulations in amounts convenient for use in preparing a reactive mixture for coating a substrate. Prior to mixing, defined proportions of the two formulations should be allocated to provide a system having a molar ratio of at least about 1.1 isocyanate groups per hydroxyl group. It is essential that the reactive mixture prepared from the system initially bear this ratio in order that the cured mixture possess the desired properties.

In providing the coated substrate of the invention, the formulations of the system are mixed at the site of the coating operation to provide a reactive mixture having the aforesaid ratio of isocyanate to hydroxyl groups. Conveniently, the formulations are so constituted that an integral ratio of, for example, 5 parts of the liquid rubber precursor formulation to 1 part of the isocyanate composition, affords the desired composition of the reactive mixture. This mixture has been found to exhibit a pot life on the order of 2–3 hrs. at moderate temperatures. Where a roof, for example, is coated under a summer sun, the pot life may be shorter than 2 hrs. but still adequate to allow a deliberate and careful application of the mixture to the roof substrate.

After the reactive mixture has been prepared, it is sprayed through a gun of convenient size onto the surface of the substrate to be coated. An air gun is preferred, to which the reactive mixture is delivered at an inlet pressure in the range of 30–35 psig. The pot life of the reactive mixture is adversely affected by excessive pressure and it is, thus, important to use relatively short delivery lines and avoid the necessity of high velocities therein. Good results are obtained, for example, if the material is delivered through a relatively short ⅜-in line to a gun having a tip diameter of ¼-in.

The material is sprayed evenly over the substrate to be coated and then allowed to cure to provide a tough, flexible, moisture-impervious coating thereon. In roofing applications, a coating density of about 2 gals/100 ft$^2$ provides highly satisfactory results.

The coating obtained from the system of the invention has been demonstrated to have essentially unlimited resistance to ponded water and to serve as a very effective vapor barrier. Thus, for example, a 30 mil thick film has a permeability of less than 0.001 g water vapor/24 hrs/in$^2$.

The cured coating has exceptionally advantageous mechanical properties. It exhibits an elongation of 500% and a tensile strength of 300 psi. Since the solids content of the formulation is on the order of 95%, there is no significant shrinkage due to loss of volatiles. Oxidation resistance is also outstanding with a loss of less than ½-mil/yr. The cured coating retains its flexibility over a wide range of temperatures and is thermally stable. It resists bleeding of process oil which might otherwise tend to saturate roof paper or felting. As a consequence, a roof consisting of the coated substrate of this invention has outstanding longevity without experiencing leakage, cracking or other deterioration. The reactive mixture, moreover, can be applied over upturned cracks at the seams of an existing roof and effectively seal them against further leakage.

The substrate portion of the coated substrate of the invention may be something other than a roof structure. Thus, for example, the system of the invention may be used to advantage as a flooring composition as well as a roofing composition. Moreover, the cost of the system of the invention is moderate despite the significant advantages which it provides.

In a further embodiment of the present invention, there are provided a formulation system, coated substrate, and method similar to those described above wherein the filling material is particulate aluminum rather than carbon black. The cured coatings of this type are heat reflective and are conveniently used as toppings for the carbon black based coating.

In the aluminum base coating, the requisite viscosity may be realized by the use of solvents alone and, thus, silica and lecithin are only optional components. Significant proportions of carbon black or asphalt must be excluded in order to avoid masking the aluminum and limiting the reflectivity of the cured coating. Set forth below are the ranges of proportions of the components for the first formulation of the system in this embodiment of the invention:

| First Formulation (Liquid Rubber Precursor) | |
|---|---|
| Hydroxy terminated butadiene polymer | 22 to 56% by weight |
| Polyether triol | 5 to 39% by weight |
| Particulate aluminum | 10 to 46% by weight |
| Molecular sieve dessicant | 0.4 to 6% by weight |
| Mercury catalyst | 0.1 to 1.5% by weight |
| Silicone resin sold under the trade designation "Paint Additive #1" by Dow-Corning | up to 4% by weight |

The methods utilized for preparing the above formulation are similar to those described above, except that no special provisions are necessary for blending asphalt with the remaining components of the first formulation. Preparation of the reactive mixture and application to the substrate are conducted in the manner similar to that described above for the carbon black base system.

In mixing the liquid rubber precursor and isocyanate formulations to provide the reactive mixture in this embodiment of the invention, the same minimum ratio of 1.1 moles isocyanate/mole of hydroxyl used for the carbon black system is applicable.

The following examples illustrate the invention.

EXAMPLE 1

A liquid rubber precursor formulation was prepared having the following composition:

| Material | Pounds |
|---|---|
| Poly bd R-45 HT hydroxyl terminated butadiene homopolymer | 100.00 |
| Poly G-430 PG polyether triol | 28.50 |
| Trumbull 85/100 asphalt | 125.00 |
| Novacite 325 low oil absorbency silica | 75.00 |
| Sterling R carbon black (Cabot Corporation) | 10.00 |
| Sta-Sol soya lecithin | 1.00 |
| KOP lime | 12.00 |
| Foamkill 8D | .50 |
| Nevastain 21 antioxidant | 2.00 |
| Busorb 34 diethyl-3-acetyl 4-hydroxy-benzyl phosphonate | 3.00 |
| Xylene | 37.00 |

In preparing this formulation, the Sun asphalt was heated to about 150° F. and blended with the APO aromatic process oil to provide a first premix. The remaining components of the formulation were mixed in a separate vessel to provide a second premix which was brought to a temperature of 150°–160° F. The first mix was then carefully blended into the second mix to provide a homogeneous formulation which was then allowed to cool.

A second (isocyanate) formulation was prepared having the following composition:

| Material | Pounds |
|---|---|
| Isonate 143 L low viscosity methylene bis (phenyl isocyanate) (Upjohn) | 38.00 |
| Uniclor 40-150 liquid chlorinated paraffin (41% chlorine) (Neville Chemical Company) | 33.00 |

The two formulations were mixed at a volumetric ratio of 9 parts of the first formulation to 1 part of the second formulation and the resultant reactive mixture was pumped from the mixing vessel through a ¾ in. line at a pressure of 30–35 psig to the inlet of an air spray gun having a ¼ in. diameter spray tip and sprayed evenly onto the surface of a roof at a thickness of 30–40 mils. The coating on the roof was allowed to cure, providing a flexible, water-imprevious barrier.

EXAMPLE 2

The following formulations were prepared in the manner described in Example 1:

| Liquid Rubber Precursor Formulation | |
|---|---|
| Material | Pounds |
| Poly bd R-45 HT | 100.00 |
| Poly G 1030 PG polyether polyol (Olin) | 65.00 |
| Asphalt | 80.00 |
| Novacite 325 | 75.00 |
| Raven 500 carbon black | 10.00 |
| Soya Lecithin | 1.00 |
| Syloid ZN-1 molecular sieve dessicant | 2.00 |
| Foamkill 8D | 0.50 |
| APO oil | 50.00 |
| Lead 36% catalyst | 0.75 |
| Nevastain 21 | 2.00 |
| Aerosil 200 fumed silica | 2.25 |
| Xylene | 10.70 |

| Isocyanate Formulation | |
|---|---|
| Material | Pounds |
| RD-206 polypropylene glycol ether diol/toluene | |

-continued

| Isocyanate Formulation | |
|---|---|
| Material | Pounds |
| diisocyanate prepolymer (Trancoa Chemical Corporation) | 85.92 |
| Xylene | 8.12 |

These formulations were mixed in a ratio of 4 gals of the first formulation to ½ gal of the second and sprayed onto a roof in the manner described in Example 1. A flexible, moisture-proof barrier was obtained.

EXAMPLE 3

The following formulations were prepared in the manner described in Example 1:

| Liquid Rubber Precursor Formulation | |
|---|---|
| Material | Pounds |
| Poly bd R-45 HT | 100.00 |
| Poly G 1030 PG | 45.00 |
| Poly G 2020 P polyether polyol (Olin) | 45.00 |
| Asphalt Solution (APO) | 150.00 |
| Novacite 375 | 75.00 |
| Raven 500 carbon black | 10.00 |
| Soya Lecithin | 1.00 |
| Syloid ZN-1 | 2.00 |
| Foamkill 8D | .50 |
| Aerosil 200 | 2.75 |
| Nevastain 21 | 2.00 |
| Xylene | 10.70 |
| Cocure 23 Hg catalyst | 1.7 |

| Isocyanate Formulation | |
|---|---|
| Material | Pounds |
| RD-206 | 80.89 |
| Xylene | 16.17 |

These formulations were mixed in a ratio of 4 gals of the first formulation to 1 gal of the second and sprayed onto a roof in the manner described in Example 1. A flexible, moisture-proof barrier was obtained.

EXAMPLE 4

The following formulations were prepared in the manner described in Example 1:

| Liquid Rubber Precursor Formulation | |
|---|---|
| Material | Pounds |
| Poly bd R-45 HT | 120.00 |
| Poly G 1030 PG | 70.00 |
| Asphalt Solution #2 (APO) | 80.00 |
| Novacite 325 | 80.00 |
| Raven 500 | 10.00 |
| Cocure 23 (25%) | 2.00 |
| Soya Lecithin | 1.00 |
| Syloid ZN-1 | 3.00 |
| Foamkill 8D | .60 |
| Aerosil 200 | 2.50 |
| Xylene | 10.00 |
| Isonol 100 N,N-bis (2 hydroxypropyl) aniline | 20.00 |

| Isocyanate Formulation | |
|---|---|
| Material | Pounds |
| RD-206 | 154.00 |
| Xylol | 7.25 |

These formulations were mixed in a ratio of 4 gals of the first formulation to 1 gal of the second and sprayed onto a roof in the manner described in Example 1. A flexible, moisture-proof barrier was obtained.

EXAMPLE 5

The following formulations were prepared in the manner generally described in Example 1, except that since no asphalt was incorporated in the formulation, the special step of preblending asphalt and aromatic process oil was not needed:

| Liquid Rubber precursor Formulation | |
|---|---|
| Material | Pounds |
| Poly bd R-45 HT | 100.00 |
| Poly G-430 PG | 40.00 |
| Silver A Aluminum | 60.00 |
| Syloid ZN-1 | |
| Molecular sieve | 4.00 |
| Xylene | 7.25 |
| Toluene | 7.25 |
| Cocure 23 | 1.14 |

| Isocyanate Formulation | |
|---|---|
| Material | Pounds |
| RD-206 | 109.54 |
| Xylene | 2.68 |

These formulations were mixed in a ratio of 2 gals of the first formulation to 1 gal of the second an sprayed onto a roof in the manner described in Example 1. A flexible moisture-proof barrier was obtained.

EXAMPLE 6

The following formulations were prepared in the manner described in Example 1:

| Liquid Rubber Precursor Formulations | |
|---|---|
| Material | Pounds |
| Poly bd R-45 HT | 520.00 |
| Poly G-430 PG | 153.00 |
| Novacite 325 | 405.00 |
| Raven 500 | 100.00 |
| Aerosil 200 | 12.00 |
| Soya Lecithin | 6.00 |
| Syloid ZN-1 | |
| Molecular sieve | 20.00 |
| Foamkill 8D | 3.50 |
| Lead 36% catalyst | 2.25 |
| Nevastain 21 | 12.50 |
| Busorb 34 | 18.00 |
| Asphalt Mix #1 | 1215.00 |
| Xylene | 58.00 |
| Dibutyl tin dilaurate catalyst | 7.23 |

| Isocyanate Formulation | |
|---|---|
| Material | Pounds |
| RD-206 | 459.22 |
| Xylene | 13.34 |

These formulations were mixed and sprayed onto a roof in the manner described in Example 1. A flexible, moisture-proof barrier was obtained.

EXAMPLE 7

The following formulations were prepared in the manner described in Example 1:

| Liquid Rubber Precursor Formulation | |
|---|---|
| Material | Pounds |
| Poly bd R-45 HT | 540.00 |
| Poly G-430 PG | 153.00 |
| Novacite 325 | 405.00 |
| Raven 500 | 100.00 |
| Aerosil 200 | 12.00 |
| Soya lecithin | 6.00 |
| Syloid ZN-1 Molecular sieve | 10.00 |
| Foamkill 8D | 3.50 |
| Nevastain 21 | 12.50 |
| Busorb 34 | 18.00 |
| APO/Asphalt mix | 1215.00 |
| Xylene | 58.00 |
| Cocure 23 | 12.50 |

| Isocyanate Formulation | |
|---|---|
| Material | Pounds |
| RD-206 | 462.0 |
| Xylene | 16.7 |

These formulations were mixed in a ratio of 5 gals of the first formulation to 1 gal of the second and sprayed onto a roof in the manner described in Example 1. The cured coating exhibited high flexibility over a wide range of temperatures and superior moisture resistance both with regard to ponded water and moisture vapor penetration.

In view of the above, it will be seen that the several objects of the invention are achieved and other advantageous result attained.

As various changes could be made in the above methods and products without departing from the scope of the invention, it is intended that all matter contained in the above description shall be interpreted as illustrative and not in a limiting sense.

What is claimed is:

1. A liquid rubber precursor formulation adapted for reaction with a second formulation containing isocyanate groups to provide a moisture-proof barrier for a substrate, said liquid rubber precursor formulation comprising between about 12 and about 32% by weight of a hydroxyl terminated butadiene polymer, between about 2 and about 14% by weight of a polyether triol having a hydroxyl number of between about 300 and about 500, between about 0.08 and about 0.8% by weight of an organo-mercury catalyst, between about 2 and about 10% by weight carbon black, between about 2 and about 24% by weight of a low oil absorbency silica, between about 0.1% and about 1% by weight of fumed silica as a suspending agent for the low oil absorbency silica, between about 0.08 and about 2% by weight of a molecular sieve dessicant, up to about 8% by weight of an organic solvent selected from a group consisting of aromatic solvents, ketones, esters and glycol ethers, and lecithin in an amount sufficient to provide a formulation viscosity of not greater than about 20,000 cps at 27° C. and at which a reactive mixture prepared from said precursor formulation and said formulation can be readily sprayed onto a substrate.

2. A formulation as set forth in claim 1 further comprising between about 4 and about 53% by weight asphalt and between about 3 and about 44% by weight of an aromatic high boiling oil in a ratio of between about 1 and about 1.5 parts by weight asphalt per part by weight aromatic oil.

3. A formulation as set forth in claim 1 further comprising between about 0.08 and about 1.2% by weight of a silicone antifoaming compound.

4. A formulation as set forth in claim 1 further comprising between about 0.04 and about 0.8% by weight of an ultraviolet light absorber.

5. A formulation as set forth in claim 1 further comprising between about 0.2 and about 1.2% by weight of an antioxidant.

6. A formulation as set forth in claim 1 wherein the lecithin content is between about 0.04 and about 0.8% by weight.

7. A system adapted for the application of a moisture-proof barrier to a substrate comprising:
   a first formulation containing between about 12 and about 32% by weight of a hydroxyl terminated butadiene polymer, between about 2 and about 14% by weight of a polyether triol having a hydroxyl number of between about 300 and about 500, between about 0.08 and about 0.8% by weight of an organo-mercury catalyst, between about 2 and about 10% by weight carbon black, between about 2 and about 24% by weight of a low oil absorbency silica, between about 0.1% and about 1% by weight of fumed silica as a suspending agent for the low oil absorbency silica, between about 0.08 and about 2% by weight of a molecular sieve dessicant, up to about 8% by weight of an organic solvent selected from the group consisting of aromatic solvents, ketones, esters and glycol ethers, and lecithin in an amount sufficient to provide a formulation viscosity of not greater than about 20,000 cps at 27° C. and at which a reactive mixture prepared from said first formulation and a second formulation containing isocyanate groups can be readily sprayed onto a substrate; and
   a second formulation containing a urethane prepolymer derived from a polypropylene glycol ether polyol and toluene diisocyanate, containing between about 13 and 17% by weight free isocyanate groups;
   the two formulations of said system being adapted for mixing to provide a reactive mixture for application to said substrate; said system comprising defined relative proportions of said formulations so as to provide a molar ratio of at least about 1.1 isocyanate groups per hydroxyl group in said reactive mixture, said first and second formulations being adapted for mixing to form said reactive mixture at the site of the substrate to be coated.

8. A system as set forth in claim 7 wherein said second formulation further comprises an organic solvent.

9. A system as set forth in claim 7 wherein said first formulation further comprises between about 4 and about 53% by weight asphalt and between about 3 and about 44% by weight of an aromatic high boiling oil in a ratio of between about 1 and about 1.5 parts by weight asphalt per part by weight aromatic oil.

10. A system as set forth in claim 7 wherein said first formulation further comprises between about 0.08 and about 1.2% by weight of a silicone antifoaming compound.

11. A system as set forth in claim 7 wherein said first formulation comprises between about 0.04 and about 0.8% by weight of an ultraviolet light absorber.

12. A system as set forth in claim 7 wherein the lecithin content of said first formulation is between about 0.04 and about 0.8% by weight.

13. A system as set forth in claim 7 wherein said first formulation further comprises between about 0.2 and about 1.2% by weight of an antioxidant.

* * * * *